US006972960B2

(12) United States Patent
Ecker et al.

(10) Patent No.: US 6,972,960 B2
(45) Date of Patent: Dec. 6, 2005

(54) ELECTRONIC MODULE ENCLOSURE HAVING HINGED FRONT COVER

(75) Inventors: Richard M. Ecker, Poughkeepsie, NY (US); Robert K. Mullady, Highland, NY (US)

(73) Assignee: International Business Machines Corporation, Armonk, NY (US)

( * ) Notice: Subject to any disclaimer, the term of this patent is extended or adjusted under 35 U.S.C. 154(b) by 225 days.

(21) Appl. No.: 10/706,350

(22) Filed: Nov. 12, 2003

(65) Prior Publication Data

US 2005/0099781 A1 May 12, 2005

(51) Int. Cl.$^7$ ............................................. H05K 5/00
(52) U.S. Cl. ................... 361/724; 361/685; 312/223.1
(58) Field of Search ............................... 361/679, 685, 361/724–727; 312/223.1–223.3

(56) References Cited

U.S. PATENT DOCUMENTS 4,002,955 A * 1/1977 Eggert et al. ............... 361/726
6,164,369 A    12/2000 Stoller ..................... 165/104.33
6,351,374 B1 *  2/2002 Sherry ........................ 361/685
6,359,775 B1    3/2002 Revis ......................... 361/683
6,816,368 B2 * 11/2004 Yokosawa .................... 361/685

* cited by examiner

Primary Examiner—Yean-Hsi Chang
(74) Attorney, Agent, or Firm—Lily Neff; Floyd A. Gonzalez

(57) ABSTRACT

An enclosure having a top which is folded over at the sides forming vertical side walls, and a bottom wall having large cut out portions. A vertical divider is positioned in the middle of the enclosure for forming two side-by-side receptacles, each for receiving an electronic module in drawer-like fashion. A front portion of the enclosure is hinged by a continuous hinge such that the front portion swings from a closed position to an open position. A tab on the front of the vertical divider engages with a slot in the front wall of the swingable front portion when the front portion is in the closed position for adding rigidity to the enclosure when the front portion is closed. A locking slide arm is provided for locking the hinged front portion in either the open or closed positions.

12 Claims, 3 Drawing Sheets

ELECTRONIC MODULE ENCLOSURE HAVING HINGED FRONT COVER

BACKGROUND OF THE INVENTION

The present invention is related enclosures for electronic modules, and is more particularly related to enclosures having a front cover movable from an open position to a closed position.

Enclosures for electronic modules are known which include hinged front covers. Enclosures which have large cutout portions in their bottom wall which are supported by a frame structure sag because of the lack of structural integrity and provide for excessive flexing when subjected to shock and vibration testing.

U.S. Pat. No. 6,164,369 issued Dec. 26, 2000 to Stoller for DOOR MOUNTED HEAT EXCHANGER FOR OUTDOOR EQUIPMENT ENCLOSURE disclosed a modular door mounted heat exchanger for use with an outdoor equipment enclosure.

U.S. Pat. No. 6,359,775 issued Mar. 19, 2002 to Revis for ACCESSIBLE DESKTOP COMPUTER and discloses a computer having a flat panel display device and a disk drive unit, each pivotable between a closed position and an open position.

BRIEF SUMMARY OF THE INVENTION

The present enclosure includes a top having folded over sides forming vertical side walls, and a bottom wall having large cut out portions. A vertical divider is positioned in the middle of the enclosure for forming two side-by-side receptacles, each for receiving an electronic module in drawer-like fashion. A front portion of the enclosure is hinged by a continuous hinge such that the front portion swings from a closed position to an open position. A tab on the front of the vertical divider engages with a slot in the front wall of the swingable front portion when the front portion is in the closed position for adding rigidity to the enclosure when the front portion is closed.

It is thus an object of the present invention to provide an enclosure for electronic modules when the electronic module requires access from below when seated in the enclosure.

It is a further object of the present invention to provide an enclosure for electronic modules when the bottom wall of the enclosure has cut out portions.

It is a further object of the present invention to provide an enclosure having a hinged front portion which is movable from a closed position to an open position, the hinged front portion adding rigidity to the enclosure such that the enclosure can pass shock and vibration tests.

BRIEF DESCRIPTION OF THE SEVERAL VIEWS OF THE DRAWING

These and other objects will be apparent to one skilled in the art from the following detailed description of the invention taken in conjunction with the accompanying drawings in which.

DETAILED DESCRIPTION OF THE INVENTION

Figure 1:
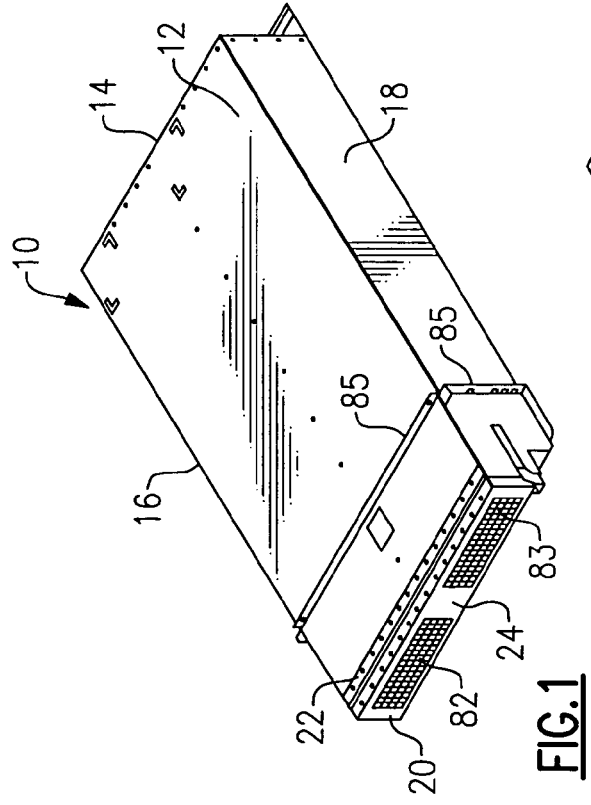
FIG. 1 is a perspective view of the enclosure of the present invention with the front portion in the closed position.
Figure 2:
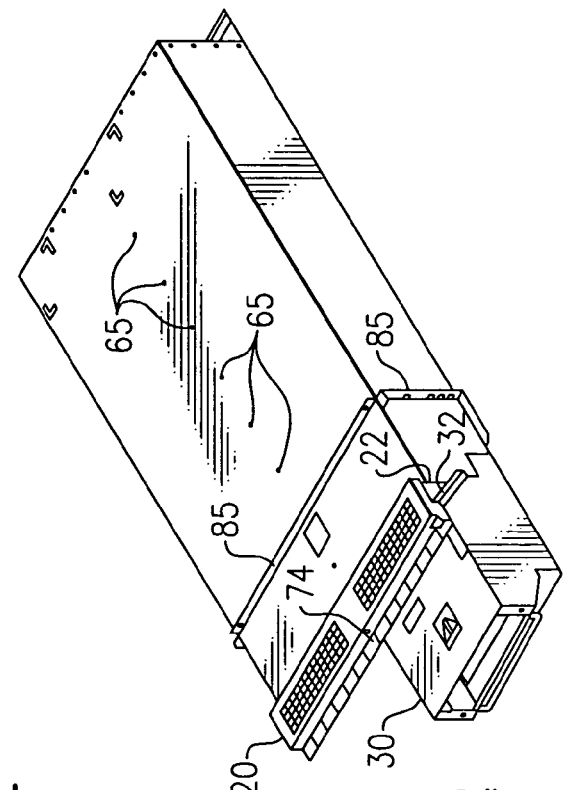
FIG. 2 is a perspective view of the enclosure of FIG. 1 with the front portion in the open position, and showing an electronic module partially inserted into the enclosure.

FIG. 1 is a perspective view of the enclosure of the present invention wherein the enclosure 10 has a top 12, a back 14, a right 16 and a left side 18, and a hinged front portion 20. The hinged portion 20 is secured across the top 12 by a continuous hinge 22. The front portion 20 includes a front cover 24 which, when in the closed or down position, covers the front opening of the enclosure as shown in FIG. 1. When the hinged front portion 20 is in the open position, the front cover 24 is in the up or open position, as shown in FIG. 2. When in the open position, the enclosure receives up to 2 electronic modules such as module 30 shown partially inserted into the enclosure 12 in FIG. 2.

Figure 3:
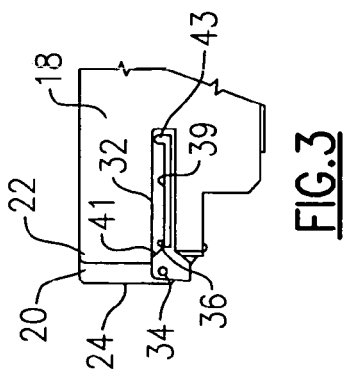
FIG. 3 is a partial side view of the enclosure taken along lines A—A of FIG. 1 showing a locking slide for holding the hinged portion in the closed position.
Figure 4:
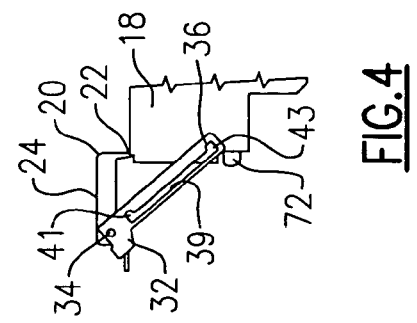
FIG. 4 is a partial side view of the enclosure taken along lines B—B of FIG. 2 showing the locking slide of FIG. 3 holding the hinged portion in the open, raised and locked position.

At least on side has a slide arm 32 which locks the hinged front portion in either the up, open position or the down, closed position. FIG. 3 is a partial side view taken along lines A—A of FIG. 1 and shows the slide arm 32 locking the hinged portion in the closed position. A front pin 34 pins one end of the slide arm 32 to the front portion 20, and a second pin 36 pins the slide arm 32 to the side 18 through a slot 39. The slot 39 has a notch 41 for locking the front portion 20 in the closed position, and a notch 43 for locking the front portion 20 in the open position. As the front portion 20 is moved from the closed position shown in FIG. 3 to the open position shown in FIG. 4, the slide arm 32 pivots around pin 34, and the pin 36 rides in the slot 39 between the locked closed position with the pin 36 in the cutout 41 to the locked open position with the pin 36 in the notch 43. It will be understood that to unlock the slide arm 32, it will have to be lifted to move the pin 36 into the slot 39 from either of the notches 41 or 43.

Figure 5:
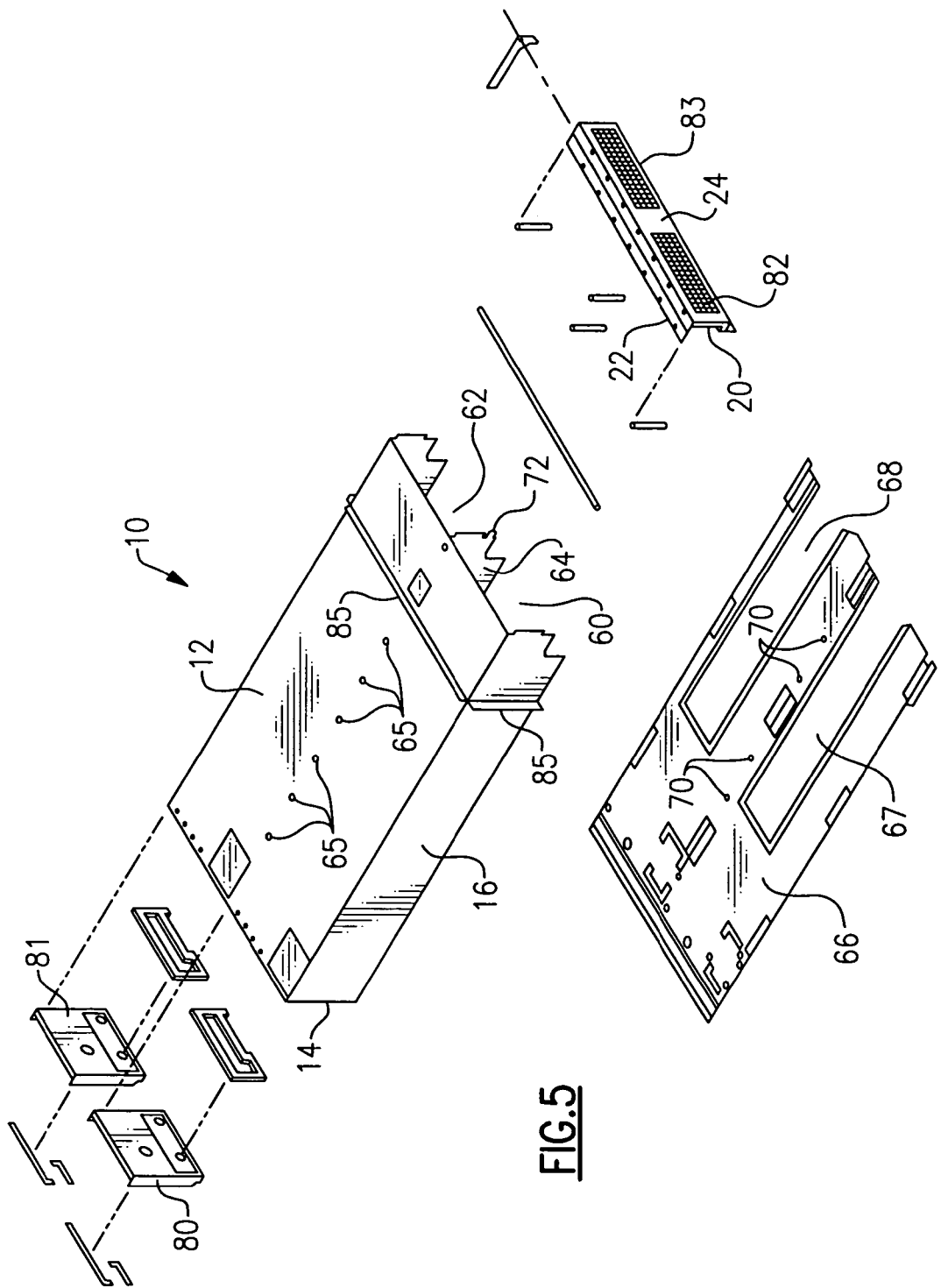
FIG. 5 is an exploded view of the enclosure of FIG. 1.
Figure 6:
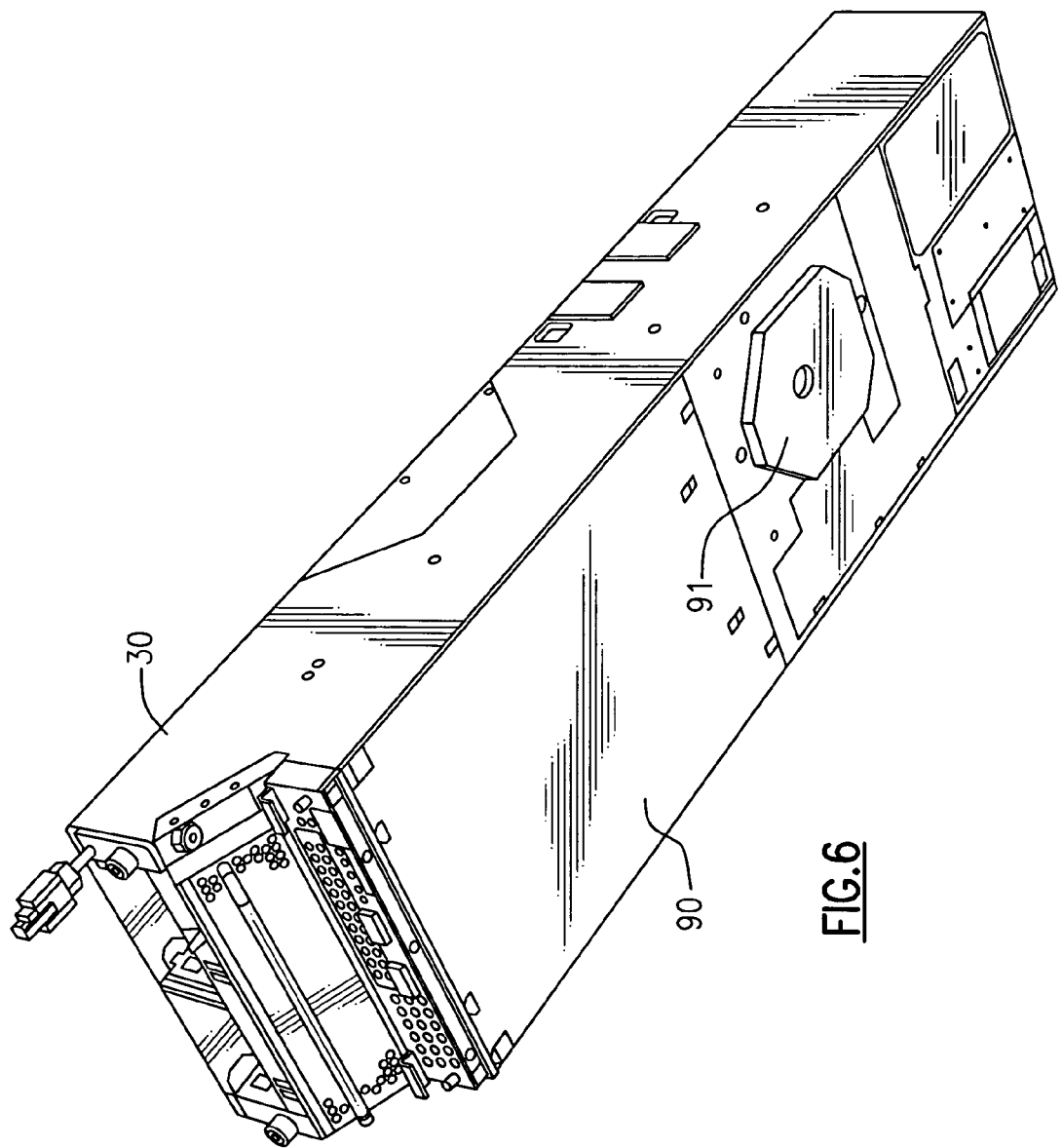
FIG. 6 is a perspective view of the bottom of an electronic module usable with the enclosure of FIG. 1 showing the embossed feature module requiring the cut out portion in the bottom wall of the enclosure.

FIG. 5 is an exploded view of the enclosure 10. In one embodiment, the top 12 and the sides 16 and 18 are formed of a single piece of sheet metal with the sides folded down as shown in FIG. 5. The sides 16 and 18 form the sides of a pair of receptacles 60 and 62 for receiving electronic modules such as module 30 shown in FIG. 2. A center divider wall 64 is fastened to the top 12 such as by rivets 65. A bottom 66 connects to the sides 16 and 18 such as by fuse welding, to define the bottom of the receptacles 60 and 62. The bottom has a two large cut out opening 67 and 68 which are sized to received embossed portions of the electronic modules 30 as shown in FIG. 6. FIG. 6 is a bottom view of the module 30 which has an embossed portion which is received in the openings 67 and 68 as the modules 30 are slidably moved into the receptacles 60 and 62. The center divider wall 64 is fastened to the bottom as with rivets 70. The center divider wall 64 further has a tab 72 which engages with a slot 74 in the cover 24 when the hinged front portion is moved to the closed position and locked. The hinge 22 across the full width of the top 12, the center divider wall 64 riveted to the top 12 and the bottom 66, and the tab 72 engaged in slot 74 adds rigidity to the enclosure 10 such that the enclosure 10 may withstand shock and vibration tests.

The back 14 of the enclosure 10 has attached tailpieces 80 and 81 through which electrical connections may be made to the electronic modules 30 in the receptacles 60 and 62. The front 24 has cooling vent members 82 and 83 through which cooling air may pass, and the enclosure 10 has a mounting flange 85 across the top 12 and down the sides 16 and 18 for mounting the enclosure 10 in a frame (not shown). In one embodiment, eight enclosures 10 are mounted into a frame, each enclosure 10 holding two electronic modules 30, each electronic module 30 being a node of a distributed computing system, for a total of 16 nodes in the frame.

FIG. 6 is a perspective view of the electronic module 30 of FIG. 2. The electronic module 30 has a bottom 90 from which extends a multi-chip module cover plate 91. The cover plate 91 extends below the chassis bottom wall 66, making the cut out portions 67 or 68, dependent upon which receptacle 60 or 62, the electronic module 30 slides into, as has been explained.

While the preferred embodiment of the invention has been illustrated and described herein, it is to be understood that the invention is not limited to the precise construction herein disclosed, and the right is reserved to all changes and modifications coming within the scope of the invention as defined in the appended claims.

What is claimed is:

1. An enclosure having a front and a back comprising:
   a top having a front and a back and two opposite sides;
   two side walls connected the opposite sides of said top leaving the front of the enclosure open;
   a bottom attached to said side walls, said bottom having open cutout portions communicating with the front side of the enclosure;
   a vertical middle divider running the length of the enclosure and fastened to the bottom between the open cutout portions and the top for forming two receptacles for receiving modules;
   a front cover for covering the open end of said enclosure; and
   a continuous hinge across the width of the top for attaching the top to the front cover along the width of the enclosure such that the front cover may move between an open position wherein the receptacles open, to a closed position wherein the front cover closes the receptacles.

2. The enclosure of claim 1 wherein said vertical middle divider has a tab extending from the front for engagement with a corresponding slot in said front cover when the front cover is in the closed position.

3. The enclosure of claim 1 further comprising a locking arm on one of the side walls for locking the front cover in the open and closed positions and allowing the front cover to swing between the open and closed position.

4. The enclosure of claim 3 wherein the locking arm is a slide arm pined at one end to the front cover by a first pin, and having a second pin in one side wall and riding in a slot in the slide arm such that the slide arm may pivot around the first pin and allow the cover to move between the open position and the closed position.

5. The enclosure of claim 4 where the slot in the slide arm has two notches, a first notch for receiving the second pin thereby locking the front cover in the open position, and a second notch for receiving the second pin thereby locking the front cover in the closed position.

6. The enclosure of claim 1 wherein said top and side walls are formed of a single piece of sheet metal wherein the sides of the top are bent thereby forming the side walls.

7. A method for enclosing electronic modules comprising:
   forming a top having a front and a back and two opposite sides of the enclosure, the enclosure having a front and a back;
   forming two side walls connected the opposite sides of said top leaving the front of the enclosure open;
   attaching a bottom to said side walls, said bottom having open cutout portions communicating with the front side of the enclosure;
   attaching a middle divider running the length of the enclosure, said middle divider fastened to the bottom between the open cutout portions and the top for forming two receptacles for receiving modules;
   forming a front cover for covering the open end of said enclosure; and
   attaching the front cover to the top by a continuous hinge across the width of the top thereby attaching the top to the front cover along the width of the enclosure such that the front cover may move between an open position wherein the receptacles open, to a closed position wherein the front cover closes the receptacles.

8. The method of claim 7 comprising providing a tab extending from the front of the middle divider for engagement with a corresponding slot in said front cover when the front cover is in the closed position.

9. The method of claim 8 further comprising providing a locking arm on one side wall for locking the front cover in the open and closed positions and allowing the front cover to swing between the open and closed position.

10. The method of claim 9 further wherein said locking arm is a slide arm and further comprises pining one end to the front cover by a first pin, and providing a second pin in one side wall for riding in a slot in the slide arm such that the slide arm may pivot around the first pin and allow the cover to move between the open position and the closed position.

11. The method of claim 10 further providing two notches in the slot in the slide arm, a first notch for receiving the second pin thereby locking the front cover in the open position, and a second notch for receiving the second pin thereby locking the front cover in the closed position.

12. The method of claim 7 further comprising bending the two sides of said top for forming the two side walls.

* * * * *